Dec. 13, 1927.

H. D. CHURCH 1,652,699

MOTOR VEHICLE TRANSMISSION

Filed Feb. 17, 1926

INVENTOR
HAROLD D. CHURCH
BY
A.H. Edgerton
ATTORNEY

Dec. 13, 1927.

H. D. CHURCH

MOTOR VEHICLE TRANSMISSION

Filed Feb. 17, 1926

INVENTOR
HAROLD D. CHURCH
BY
A. H. Edgerton
ATTORNEY

Dec. 13, 1927.

H. D. CHURCH 1,652,699

MOTOR VEHICLE TRANSMISSION

Filed Feb. 17, 1926

INVENTOR
HAROLD P. CHURCH
BY
ATTORNEY

Patented Dec. 13, 1927.

1,652,699

UNITED STATES PATENT OFFICE.

HAROLD D. CHURCH, OF CLEVELAND HEIGHTS, OHIO, ASSIGNOR TO THE WHITE MOTOR COMPANY, OF CLEVELAND, OHIO, A CORPORATION OF OHIO.

MOTOR-VEHICLE TRANSMISSION.

Application filed February 17, 1926. Serial No. 88,859.

This invention relates to motor vehicles and more particularly to speed change gearing for automotive vehicle mechanical transmissions.

One object of the invention is to provide an improved mechanical transmission, wherein there may be accomplished a given gear reduction from the propeller shaft operating at engine speed to the wheel driving axles, and at the same time maintaining a considerable clearance between the gear and axle housings and the surface of the ground supporting the vehicle.

Another object of the invention is to provide an improved disposition of the parts of the improved transmission, whereby they will cooperate efficiently to accomplish the results sought, and whereby they will be accessible for purposes of inspection, adjustment and replacement, whenever desired.

Another object of the invention is to provide for lubrication of the working parts of the improved transmission mechanism.

Another object of the invention is to provide a housing comprising sections so connected together as to permit ready inspection of the working parts and at the same time permitting a compact disposition of the working parts.

Another object of the invention is to provide for the ready assembly, removal, and/or replacement of the various parts of the improved mechanism.

Another object of the invention is to provide a structure which, although efficient in operation and possessing the above and other advantages, will be relatively inexpensive to manufacture and to maintain in operative condition.

Other objects of the invention and the invention itself will be apparent from reference to the following description of an embodiment of the invention, and in which description reference will be had to the accompanying drawings illustrating the said embodiment.

Referring to the drawings.

Figure 1:
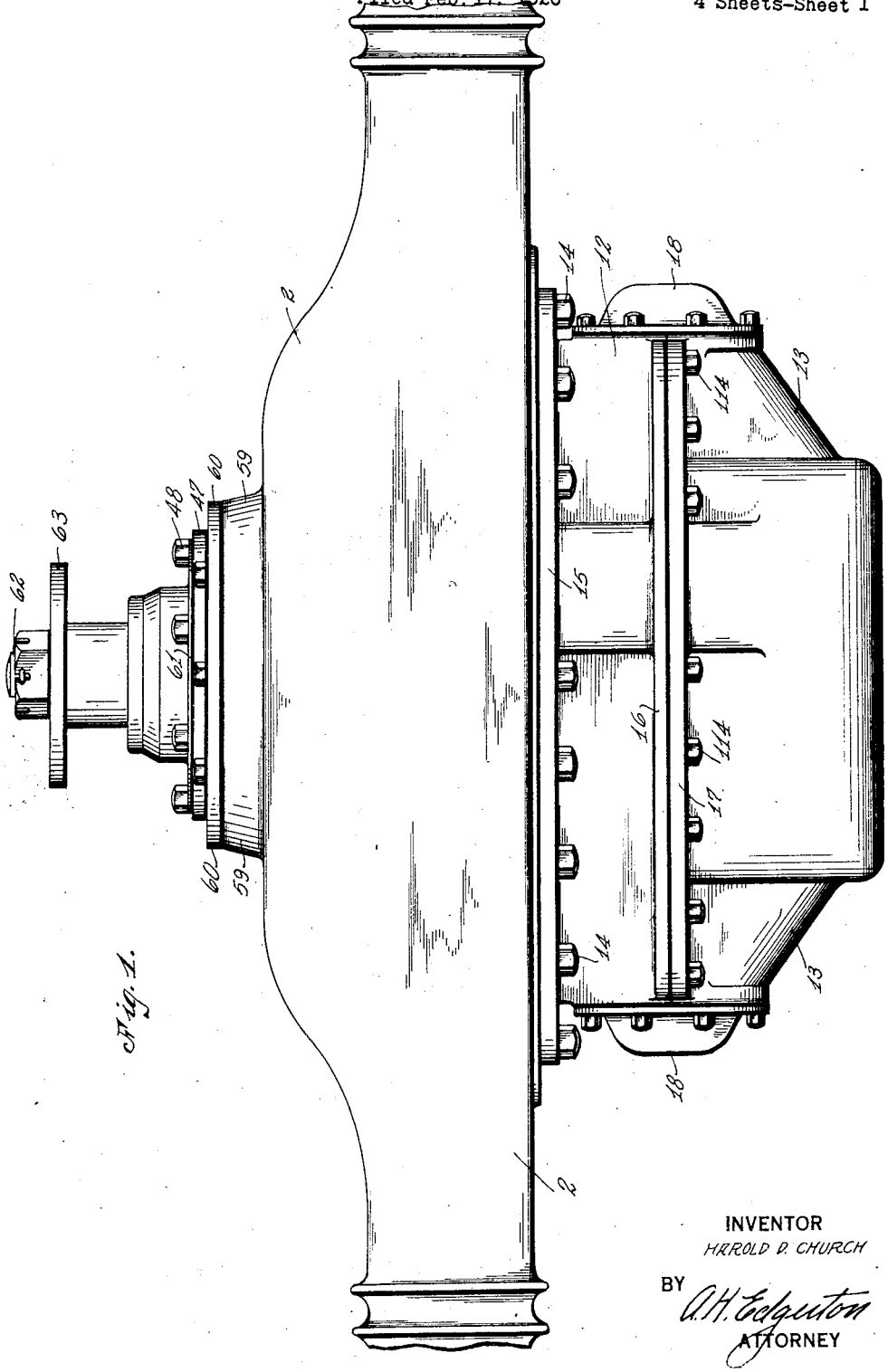
Figure 1 is a plan view of the exterior of a transmission casing.
Figure 2:
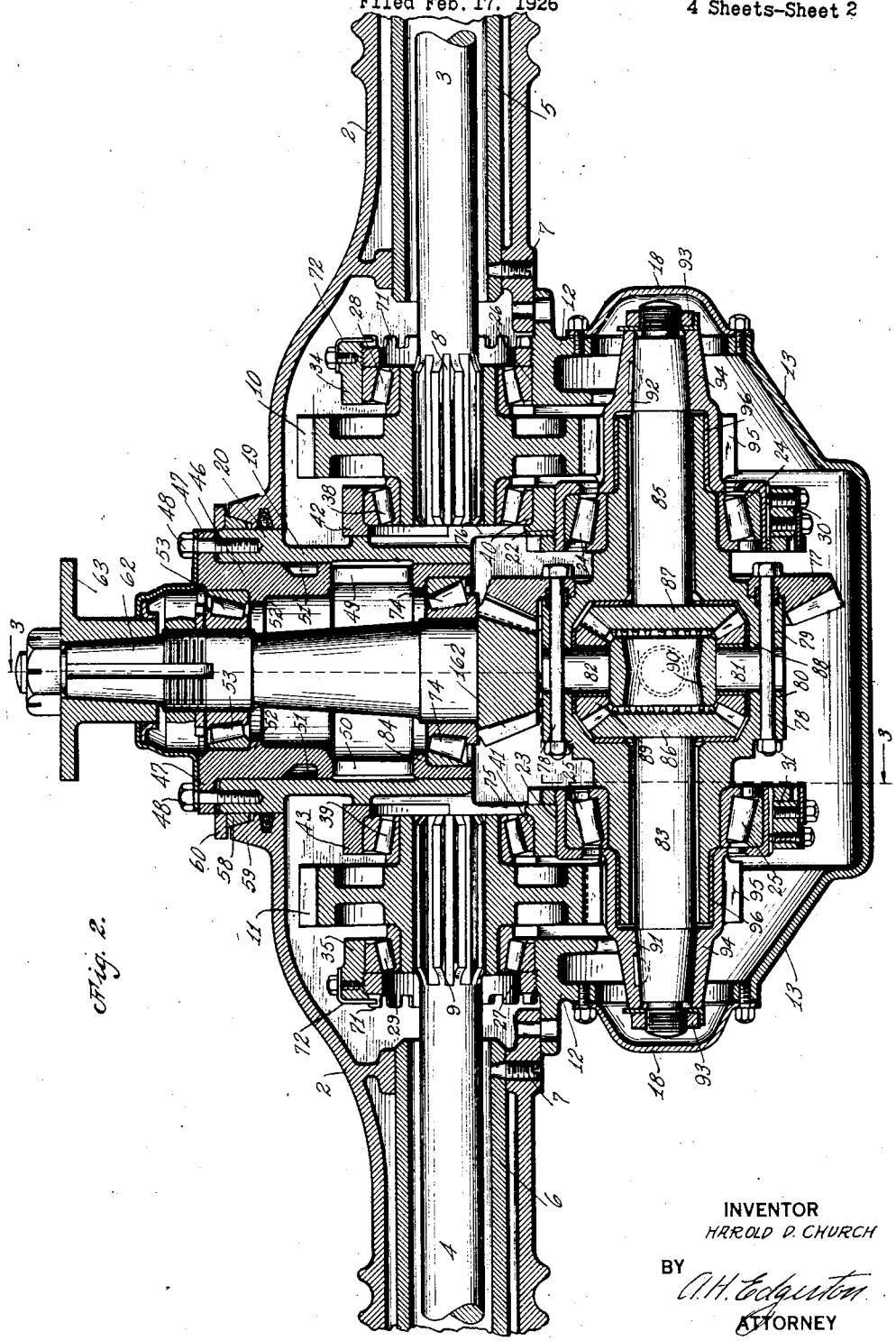
Figure 2 is a horizontal medial section, through the gear casing of a transmission mechanism embodying the invention.

Referring to the different figures of drawing, in all of which like parts are designated by like reference characters, the transmission casing, in the present case, comprises a rear axle housing, 2, for the axle drive shafts 3 and 4 of an automotive vehicle transmission. The outer ends of the drive shafts are adapted to drive the wheels of the vehicle which are preferably journaled on fixed axle tubes 5 and 6. The axle tubes 5 and 6 are held against rotation by locking set screws 7 screw threaded into openings in the axle housing and having projecting tapered ends which extend within perforations provided for the purpose in the axle tubes. The inner ends of the drive shafts 3 and 4 are splined, as shown at 8 and 9 to spur gears 10 and 11, respectively. A housing comprising two sections 12 and 13, is secured to the rear axle casing 2 by bolts 14 passing through a flange 15 of a frame member of the section 12. The housing section 13 is bolted on to the rear open end of the section 12 by bolts 114, which bolts pass through abutting flanges 16 and 17 of the housing sections 12 and 13, respectively, being threaded into the flange 16. Caps 18 are provided on opposite lateral ends of the housing section 12 and 13. The housing section 12 comprises an inwardly projecting frame portion, best shown in Figures 3 to 6, inclusive, wherein an integral tubular extension 19 is carried on the section 12, projecting forwardly therefrom, and terminated at its forward end in a pilot flange 20.

Bearing seats, 22 and 23, integrally formed with the section 12, are provided for the anti-friction bearings 24 and 25, and as shown at 26 and 27, there are bearing seats for the anti-friction bearings 28 and 29. Bearing caps 30 and 31 are provided for the bearing seats 22 and 23 and are secured thereto by bolts 32 and 33. Bearing caps 34 and 35 are provided for the seats 26 and 27 and are secured thereto by bolts 36 and 37, respectively.

Bearing seats 40 and 41, integral with the section 12, are provided to support the antifriction bearings 38 and 39 which are retained by bearing caps illustrated, respectively, at 42 and 43, and bolted thereon by cap screws 44 and 45. A tubular bearing support 46, having an outer peripheral flange 47, is inserted within the tubular extension 19 of the housing section 12 and is rigidly secured thereto by cap screws 48 passing through perforations in the flange 47 and screw threaded into the pilot flange 20 of the tube 19. The bearing support 46 is laterally perforated at 49 and 50 and has its outer surface relieved at 51.

Within the tubular bearing support 46, there is an inwardly extending annular flange 52, which forms a seat for an anti-friction bearing 53; likewise, an inwardly extending annular flange 84, integral with the lower portion of the inner wall of the bearing support 46, forms a seat for an anti-friction bearing 74.

Figure 3:
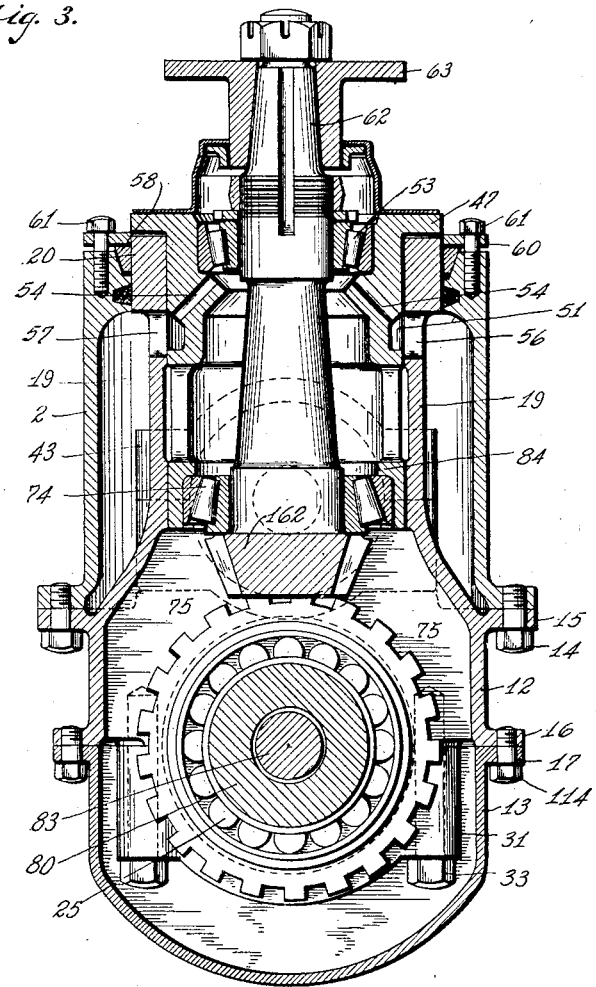
Figure 3 is a section taken on the line 3—3 of Figure 2.
Figure 6:
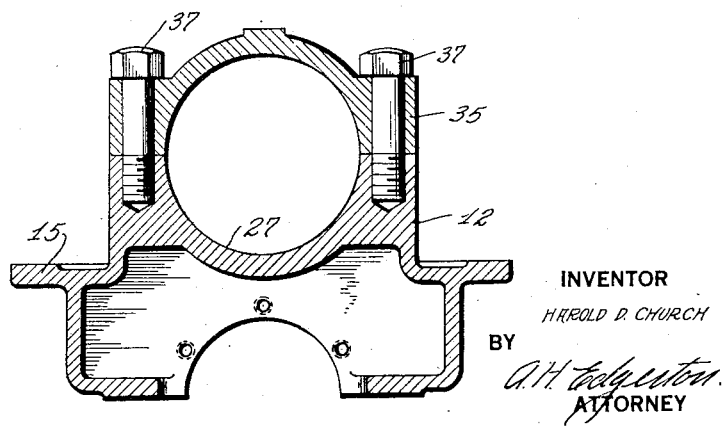
Figure 6 is a detail view in section taken upon a plane indicated by the lines 6—6 of Figure 4.
Figure 4:
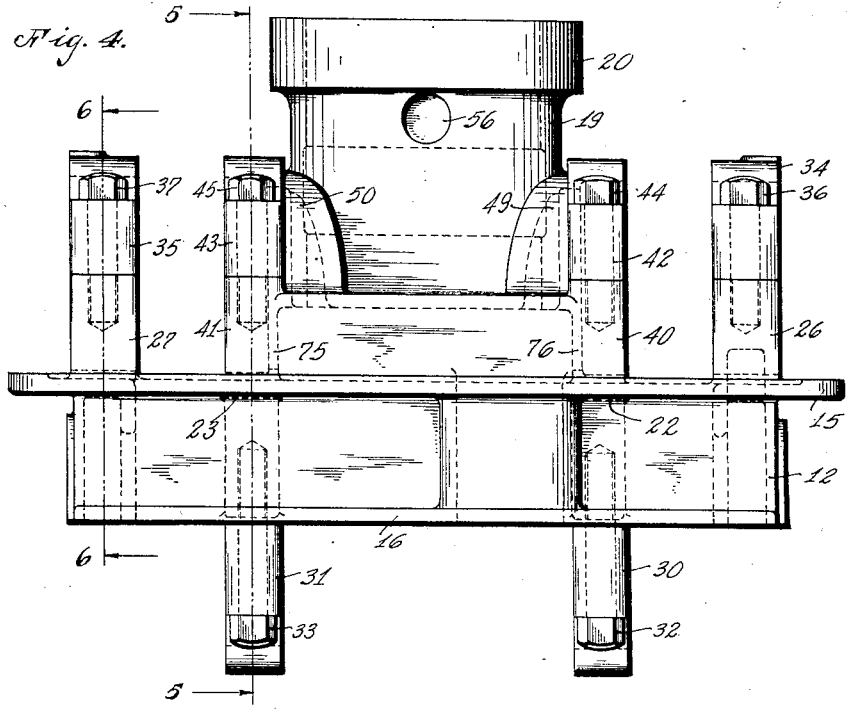
Figure 4 is a view in side elevation of a skeleton frame element adapted to support certain of the moving parts illustrated in the foregoing Figures 2 and 3.
Figure 5:
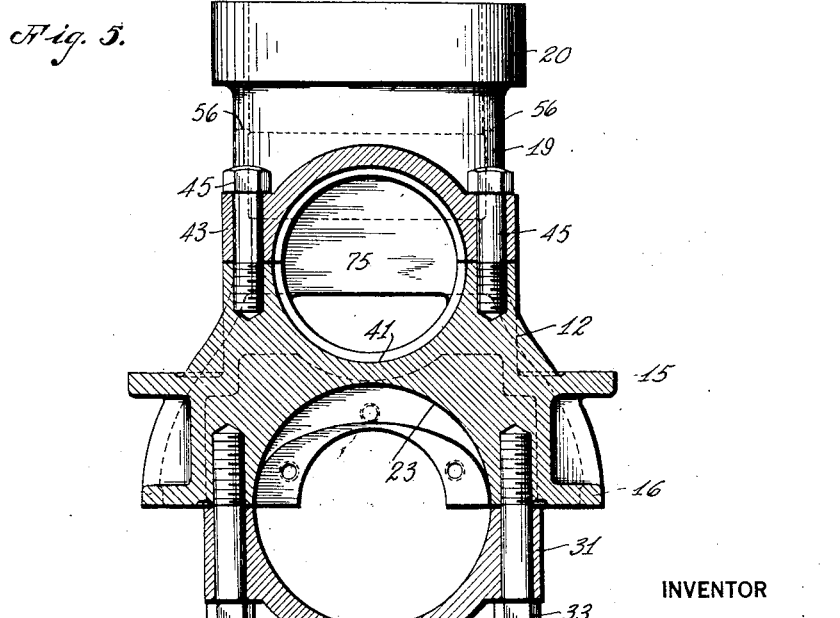
Figure 5 is a vertical section partly in elevation taken upon a plane indicated by the lines 5—5 in Figure 4.

In order to communicate lubricant from the exterior to the bearing 53 on the interior of the tubular bearing support 46, there is provided a plurality of lubricant communicating passages 54 extending forwardly and inwardly from the recessed portion 51 of the bearing support through the inwardly projecting flange 52 as illustrated in Figure 3. The walls of the tubular extension 19 of the section 12 are perforated at 56 and 57 to permit lubricant to be communicated to the bearing 53 through the communicating passages 54 from the interior of the gear housing, which when the mechanism is in operation, will be charged with a supply of lubricant.

A wedge ring 58, is secured in position between an inwardly converging annular surface of an annular boss 59 of the axle casing 2, and the exterior wall of the flange 20, by a clamping ring 60 adapted to be drawn axially into clamping position by a plurality of cap screws 61.

The embodiment of the invention is herein described as being applied to an automotive vehicle, such as an automobile, which has a pair of lateral drive shafts 3 and 4 for communicating the driving effort from an automotive engine to the drive wheels of the vehicle, and is provided with a driving shaft 62 adapted to be coupled to the vehicle propeller shaft leading from the engine by a flange 63. The driving shaft 62 is provided at its rearward end with a beveled gear 162, preferably, as shown, integrally formed therewith, and is supported in correct axial alignment within the tube 46 upon the anti-friction bearings 53 and 74. The spur gears 10 and 11, splined on to the inner ends of the final drive shafts 3 and 4, are each journaled in a pair of bearings, the gear 10 having its laterally extending hub portions journaled within the antifriction bearings 28 and 38 and the spur gear 11, having its lateral extending hub portions journaled within the anti-friction bearings 39 and 29. An adjustable locking ring for each of the bearings is provided, comprising a castellated exteriorly threaded annular ring 71, each of the said threaded rings being screw threaded within extending portions of the bearing seats and caps therefor, for the bearings 28 and 29, respectively. Locking tongues 72 are provided for the rings 71 and are secured to the bearing caps 34 and 35, respectively, the tongue portion being disposed between projections of the castellated ring to prevent rotation thereof.

Integrally joining the casing section 12, and the forwardly projected tubular frame element 19, a connecting web is provided comprising laterally disposed portions 75 and 76.

As illustrated at 77, a beveled ring gear of a differential mechanism is secured by bolts 78 to a differential housing which comprises laterally disposed sections 79 and 80 joined together by the bolts 78. Extending radially from a common hub 90 of a differential gear spider, there is a set of four stub shafts, two of which are shown at 81 and 82. These stub shafts are secured to the joined housing sections 79 and 80 by the bolts 78 which pierce the outer ends of said stub shafts. A pair of axially aligned, oppositely extending differential gear shafts 83 and 85, carry on their inner ends integrally formed differential gear pinions 86 and 87, respectively, the said pinions being in continual mesh with the set of differential gear pinions, such as 88 and 89, which pinions are rotatably carried on the inner ends of the radially disposed stub shafts, as shown at 81 and 82. To the tapered ends of the differential gear shafts and non-rotatably keyed thereto, there is provided a pair of gear elements 91 and 92, these being retained on the shafts by retaining nuts 93. The gear elements 91 and 92, comprise tapered hub portions 94, and inwardly extending cup portions having spur gear teeth 95 formed on their exterior surfaces, the said spur gears 95 being in continuous mesh with the final drive spur gears 10 and 11, respectively. The housing sections 79 and 80 are rotatably mounted in the gear case upon the non-friction bearings 24 and 25, respectively. Cylindrical wear bushings 96 are interposed between the extended ends of the housing elements 79 and 80 and the cup shaped portion of the gear elements 94, to permit rotation of the said gear elements relative to the housing upon differential action of the mechanism.

The mechanism illustrated in the drawings and above described is effective to transmit the driving effort of the propeller shaft, communicated through the driving pinion 162, through the set of differential gears, comprising the ring gear 77 and the differential pinions, such as shown at 86, 87, 88 and 89, and through the differential gear shafts laterally disposed with reference to each other and axially aligned, and through the spur gears 95 to the final drive spur gears 10 and 11 mounted on the final drive shafts 3 and 4, respectively. The differential action will be that commonly had in differential mechanisms of this general type, the spur gears 95 and their cooperating spur gears 10 and 11 being effective for the purpose of introducing an additional reduction in the relative speeds of the driving shaft 62 and the final drive shafts 3 and 4 over that commonly had in differential gear mechanisms.

It will be obvious that various changes may be made in the details of construction of the various parts described herein and in their manner of arrangement without departing from the spirit of the invention, and it will be understood that the invention is not limited to the precise construction and arrangement shown and described.

I claim as my invention—

1. In a rear axle mechanism, the combination with a housing, comprising separable forward and rear sections, the rear section having a forward extension projected within the forward housing section, a driving shaft, a pair of driven shafts, a differential gear mechanism adapted to be actuated by the driving shaft and to differentially actuate the driven shafts, a pair of speed reducing spur gears interposed between the differential gear mechanism and the said driven shafts, anti-friction bearings for the driving shaft and the driven shafts, said forwardly projecting portion of the rear housing section supporting the said driving shaft bearings, said rear section forward extension comprising a forwardly disposed tubular portion, a flanged liner for the said tubular portion, securing means to secure the liner to the said portion by its flanges, said liner being interposed between the driving shaft bearings and the said tubular portion as a unit through an opening in the forward portion of the housing, said tubular portion terminating in a substantially cylindrical pilot portion and means comprising a wedge ring for rigidly aligning the tubular portion within the opening.

2. In a rear axle mechanism, the combination with a housing, comprising separable forward and rear sections, the rear section having a forward extension projected within the forward housing section, a driving shaft, a pair of driven shafts, a differential gear mechanism adapted to be actuated by the driving shaft and to differentially actuate the driven shafts, a pair of speed reducing spur gears interposed between the differential gear mechanism and the said driven shafts, anti-friction bearings for the driving shaft and the driven shafts, said forwardly projecting portion of the rear housing section supporting the said driving shaft bearings, said rear section forward extension comprising a forwardly disposed tubular portion, a flanged liner for the said tubular portion, securing means to secure the liner to the said portion by its flanges, said liner being interposed between the driving shaft bearings and the said tubular portion, said bearings and driving shaft being removable from the said tubular portion as a unit through an opening in the forward portion of the housing, said liner having openings through its lateral walls, said tubular portion having laterally disposed openings through its walls, said wall openings comprising lubricant passages to convey lubricant to the driving shaft bearings.

3. In a driving axle, the combination with an axle housing having an enlarged middle portion with an opening therein, of a driving shaft projected into the opening, of a pair of concentric tubular elements telescoped over the driving shaft, and bearings supporting the driving shaft on the inner of said tubular elements, said inner tubular element having an exterior laterally extending flange, securing means to secure the inner and outer elements together by the said exterior flange at an end of each element, said outer element having a laterally extending flange at its other end being projected through a second opening in the housing, said second element having a laterally extending flange, securing means to secure said second element to the housing by said flange, a pair of axle sections disposed in the housing and having their inner ends supported by said outer tubular element, driving connections between the driving shaft and the axle sections, and means for clamping the said first end of the outer element to the housing at its first said opening.

4. In an axle mechanism, the combination with a housing having an enlarged middle portion, and lateral large and small openings through opposite walls of said portion, axle sections disposed in the housing with their inner ends projected into the said housing middle portion, a driving shaft projected into the housing from the exterior thereof through the said small opening, driving connections between the shaft and the axle sections, a tubular support for the driving axle having a laterally extending flange, said support having an end of its tubular portion disposed within the said opening, its lateral flange being secured to the housing exterior thereof adjacent the said larger housing opening, clamping means to clamp the said tubular portion to the housing centrally of the smaller opening, said tubular element comprising portions adapted to support the ends of said axle sections.

5. In an axle mechanism, the combination with a housing comprising separable front and rear sections, said front section being forwardly apertured, the rear section having a forwardly extending tubular extension projected into the front section and having a pilot end portion disposed within divergent inner walls of its aperture and through its aperture, a driving shaft, a pair of driven shafts, driving connections between the driving shaft and the driven shafts, said tubular extension supporting the driving shaft, and a wedge ring adapted to be clamped between opposing divergent surfaces of the pilot portion tubular extension and the divergent aperture walls for rigidly axially aligning the said tubular extension with the aperture.

In testimony whereof I hereunto affix my signature this 13th day of February, 1926.

HAROLD D. CHURCH.